United States Patent
Eggleston (10) Patent No.: US 8,281,442 B2
(45) Date of Patent: Oct. 9, 2012

(54) WIND TURBINE BLADE INSPECTION AND CLEANING SYSTEM

(75) Inventor: Eric Eggleston, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 12/505,286

(22) Filed: Jul. 17, 2009

(65) Prior Publication Data
US 2010/0132137 A1     Jun. 3, 2010

(51) Int. Cl.
*B08B 1/00*     (2006.01)
(52) U.S. Cl. .............................. 15/3; 15/21.1
(58) Field of Classification Search .............. 15/21.1, 15/3, 88.4, 246, 256.5
See application file for complete search history.

(56) References Cited

U.S. PATENT DOCUMENTS

| | | | |
|---|---|---|---|
| 5,576,492 A * | 11/1996 | Phalin | 73/634 |
| 6,964,312 B2 * | 11/2005 | Maggio | 180/164 |
| 7,832,030 B2 * | 11/2010 | Nunez et al. | 4/661 |
| 2005/0042102 A1 * | 2/2005 | Teichert | 416/146 R |
| 2009/0020361 A1 | 1/2009 | Teichert | |
| 2009/0173573 A1 * | 7/2009 | Teichert | 182/19 |

FOREIGN PATENT DOCUMENTS

EP     1517033     3/2005

OTHER PUBLICATIONS

AH Industries Projects; "Blade Cleaning—A Very Sound Investment," http://www.ah-projects.dk/page272.aspx.
Pro-Bel; "Blade Access Cleaning System for Wind Turbines," www.pro-belusa.com.
http://www.alternative-energy-news.info/images/pictures/riwea-wind-turbine-inspection-robot-large.jpg.
http://www.treehugger.com/files/2009/01/rope-climbing-robot-inspects-wind-turbines.php.

* cited by examiner

*Primary Examiner* — Laura C Guidotti
(74) *Attorney, Agent, or Firm* — Fletcher Yoder P.C.

(57) ABSTRACT

In one embodiment, a system includes a blade maintenance vehicle. The blade maintenance vehicle includes a self-contained balance configured to stabilize the blade maintenance vehicle on an upwardly facing edge of a horizontally positioned wind turbine blade.

22 Claims, 4 Drawing Sheets

FIG. 4

WIND TURBINE BLADE INSPECTION AND CLEANING SYSTEM

BACKGROUND OF THE INVENTION

The subject matter disclosed herein relates to a wind turbine blade inspection and cleaning system.

Wind turbines typically include multiple blades extending from a central hub. The hub is rotatably coupled to a nacelle suspended above the ground by a tower. Generally, the nacelle houses an electric generator coupled to the hub and configured to generate electrical power as the blades are driven to rotate by the wind. Wind turbine blades are typically precisely designed and manufactured to efficiently transfer wind energy into rotational motion, thereby providing the generator with sufficient rotational energy for power generation. Blade efficiency is generally dependent upon blade shape and surface smoothness. Unfortunately, during operation, debris (e.g., dirt, bugs, sea salt, etc.) is collected on the blades, thereby altering the shape and degrading the smoothness. Furthermore, rocks or other fragments may scratch or erode the blades upon contact.

Therefore, regular inspection and cleaning of the blades may serve to maintain wind turbine efficiency. Blade cleaning and inspection is typically performed manually by hoisting a person to a position adjacent to each blade via suspension from the tower, the hub, or a proximately located crane. The person then cleans and/or inspects the blade. For example, the person may take pictures of the blades for later analysis or perform erosion tests on the blade surface. However, manual blade maintenance is time consuming and expensive, and is therefore generally performed at longer than desired time intervals. Consequently, wind turbines may operate in an inefficient manner for significant periods.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an automated vehicle configured to traverse an upwardly facing edge of a wind turbine blade when the wind turbine blade is oriented in a substantially horizontal position. The automated vehicle includes multiple wheels configured to engage the wind turbine blade, and a drive unit configured to rotate at least one of the wheels. The automated vehicle also includes a cleaning system configured to clean the upwardly facing edge of the wind turbine blade.

In a second embodiment, a system includes a blade maintenance vehicle including a blade maintenance system configured to perform one or more maintenance functions associated with a wind turbine blade. The blade maintenance vehicle also includes a self-contained drive configured to move the blade maintenance vehicle along the wind turbine blade, and a self-contained support configured to support the blade maintenance vehicle on the wind turbine blade.

In a third embodiment, a system includes a blade maintenance vehicle. The blade maintenance vehicle includes a self-contained balance configured to stabilize the blade maintenance vehicle on an upwardly facing edge of a horizontally positioned wind turbine blade.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may significantly reduce wind turbine blade cleaning and inspection costs by employing an automated vehicle configured to traverse an edge of the blade while performing certain cleaning and inspecting operations. For example, as discussed in detail below, the automated vehicle may be completely self-contained, self-balanced, self-supported, and self-driven without external assistance. In certain embodiments, the automated vehicle is configured to traverse an upwardly facing edge of a horizontally positioned wind turbine blade by balancing on the upwardly facing edge using multiple wings extending laterally from a body. In certain configurations, the wings are configured to automatically reposition based on lateral movement of the automated vehicle with respect to the wind turbine blade. Further embodiments may include a cleaning system configured to clean the upwardly facing edge of the wind turbine blade. The cleaning system may include a rotating brush configured to remove debris from the blade upon contact. The cleaning system may also include a cleaning fluid delivery system configured to spray cleaning fluid onto the wind turbine blade. Further embodiments may include an inspection instrument configured to identify cracks, pits, or other defects within the blade. The inspection instrument may include a digital camera or an ultrasonic transducer, for example. These features may enable the automated vehicle to both clean and inspect a wind turbine blade without hoisting or otherwise suspending maintenance personnel adjacent to the blade, thereby significantly reducing maintenance costs and facilitating more frequent cleaning and inspecting operations.

Figure 1:
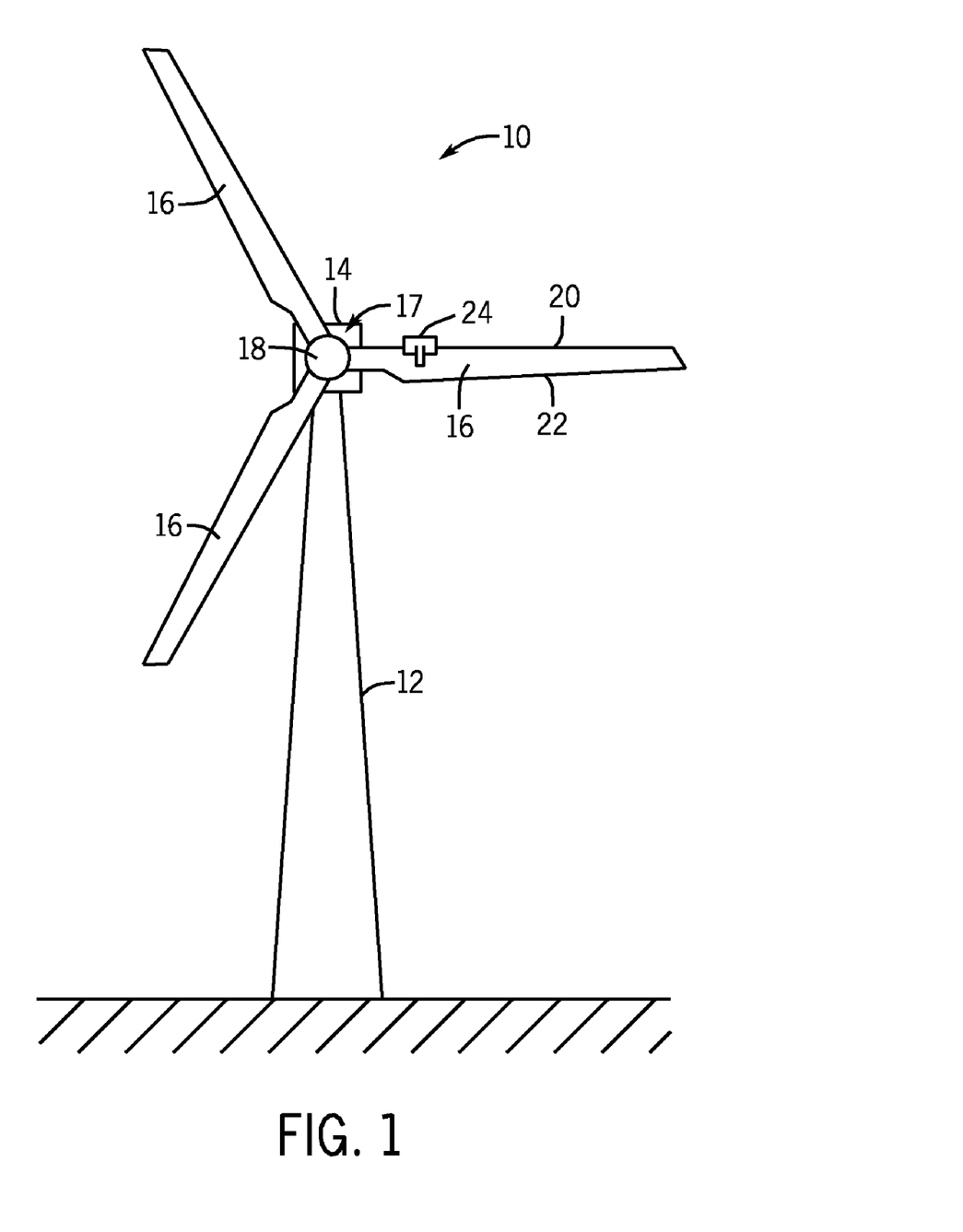
FIG. 1 is a front view of a wind turbine that may employ a blade cleaning and inspection system in accordance with certain embodiments of the present technique.

FIG. 1 is a front view of a wind turbine system 10 configured to convert wind energy into electrical energy. The wind turbine system 10 includes a tower 12, a nacelle 14 and blades 16. The blades 16 are coupled to a generator 17 within the nacelle 14 by a hub 18 that rotates with the blades 16. The blades 16 are particularly configured to convert the linear air flow from the wind into rotational motion. As the blades 16 rotate, the coupling between the hub 18 and the generator 17 within the nacelle 14 drives the generator 17 to rotate, thereby producing electrical energy. While three blades 16 are included in the wind turbine system 10 of the present embodiment, alternative embodiments may include more or fewer blades 16. For example, certain embodiments may include 2, 3, 4, 5, 6, 7, 8, or more blades 16.

Each blade 16 includes a leading edge 20 and a trailing edge 22. The air flow engages the leading edge 20 and flows toward the trailing edge 22. Due to the shape of the blades 16, aerodynamic forces caused by the flow induce the blades 16 to rotate, thereby driving the generator 17 to produce electrical power. Efficiency of the wind turbine system 10 is at least partially dependent upon converting linear air flow into rotational energy. Therefore, the blades 16 are particularly configured to efficiently transfer wind energy into rotational motion. For example, blade shape may be selected to enhance air flow over the blade 16 such that aerodynamic forces induce the blade 16 to rotate. In addition, the blades 16 are typically manufactured to be substantially smooth, such that air flows over the blades 16 without interference. However, during operation, debris may be collected on the blades 16, thereby altering the shape and/or degrading the smoothness. For example, salt deposits may form on the blades 16 of wind turbine systems 10 that operate off coastal regions. As the salt builds on the blades 16, blade shape may be altered, resulting in a less efficient profile. In addition, the salt deposits may decrease the surface smoothness of the blades 16, thereby interfering with air flow over the blades 16. Similar buildup on the blades 16 may be caused by bugs, dirt, sand, pollen, or other material. As a result of the debris buildup, the efficiency of the wind turbine system 10 may be reduced.

In addition, sand, rocks, or other larger fragments may impact the blades 16 during operation. The impact from these particles may cause pits or cracks to form within the blades 16. Such defects may lead to degraded blade performance due to interference with air flow over the surface of the blade 16. In addition, small cracks within the blades 16 may propagate over time and lead to larger defects. Therefore, regular inspection and maintenance may serve to maintain the blades 16 in an efficient operating condition.

In the present embodiment, an automated wind turbine blade cleaning and inspection system or vehicle 24 (i.e., blade maintenance vehicle) is configured to clean and/or inspect the blades 16. As illustrated, a wind turbine blade 16 is first oriented in a substantially horizontal position (e.g., substantially parallel to the ground). The automated vehicle 24 may then be placed on an upwardly facing edge. For example, certain wind turbine systems 10 enable an operator to access the nacelle 14 to perform routine maintenance operations on components within the nacelle 14 (e.g., generator, gearbox, shafts, etc.). Furthermore, the operator may have access to the hub 18 and blades 16 from the nacelle 14. In such configurations, an operator may place the automated vehicle 24 on an upwardly facing edge of the horizontally positioned wind turbine blade 16, as illustrated. In the present embodiment, the automated vehicle 24 is placed on the leading edge 20. However, as will be appreciated, the hub 18 may be rotated 180 degrees such that the trailing edge 22 faces upwardly. The automated vehicle 24 may then traverse the blade 16, and clean and/or inspect the upwardly facing edge (e.g., the leading edge 20 and/or the trailing edge 22). As will be appreciated, debris on the leading edge 20 may have a significant impact on wind turbine blade efficiency. Therefore, in certain embodiments, the leading edge 20 alone may be cleaned and inspected by the automated vehicle 24.

As discussed in detail below, the automated vehicle 24 may be properly balanced such that it may traverse the upwardly facing edge even in high wind conditions. For example, the automated vehicle 24 may include a self-contained support or balance, such as wings extending from each lateral side of the vehicle 24. The wings may be sloped downwardly such that the center of gravity of the automated vehicle 24 is positioned below the upwardly facing edge. This configuration may serve to maintain the stability of the automated vehicle 24 as it traverses the blade 16. In certain configurations, the wings are adjustable to automatically balance the automated vehicle 24. In addition, the automated vehicle 24 may include a cleaning system and an inspection instrument. As the automated vehicle 24 traverses the blade 16, the cleaning system may remove debris accumulated on the leading edge 20, while the inspection instrument scans the surface of the blade 16 for defects. Using the automated vehicle 24, costs associated with blade cleaning and inspection may be significantly reduced. The reduced costs may enable more frequent cleanings and inspections, thereby increasing wind turbine system efficiency.

Figure 2:
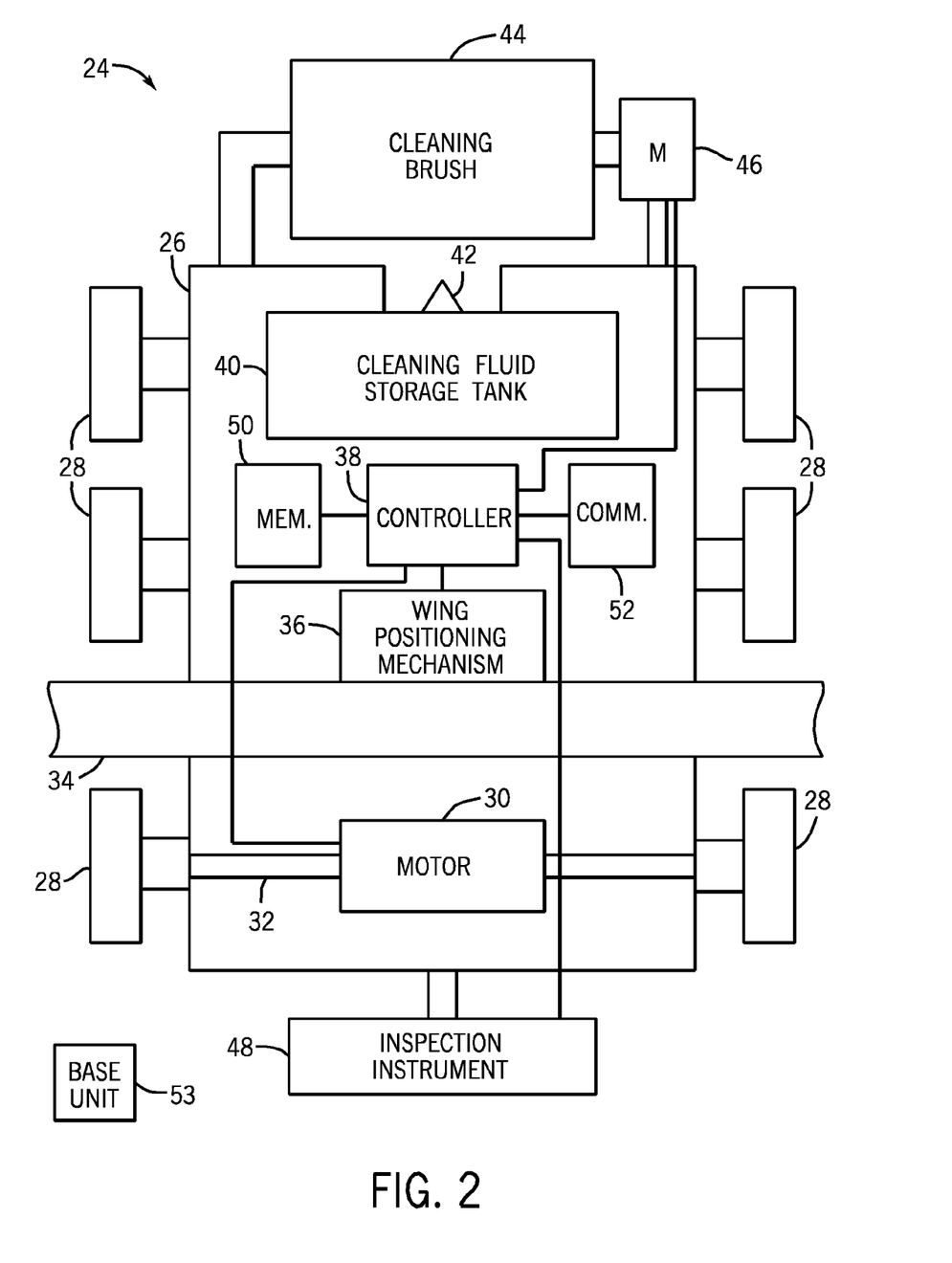
FIG. 2 is a block diagram of an automated wind turbine blade cleaning and inspection system, as shown in FIG. 1, in accordance with certain embodiments of the present technique.

FIG. 2 is a block diagram of the automated vehicle 24 of FIG. 1. The automated vehicle 24 includes a body 26 configured to support a blade maintenance system including a blade cleaning system and an inspection instrument. The blade maintenance system is configured to perform one or more maintenance functions associated with a wind turbine blade 16, such as cleaning, inspection and/or repair operations. In the present embodiment, six wheels 28 are rotatably coupled to the body 26. As discussed in detail below, the wheels 28 are configured to engage each lateral side of the upwardly facing edge of the wind turbine blade 16, thereby increasing the stability of the vehicle 24. While six wheels 28 are illustrated in the present embodiment, more or fewer wheels 28 may be employed in alternative embodiments. For example, certain embodiments may includes 2, 4, 6, 8, 10 or more wheels 28. In certain configurations, the wheels 28 include a rubber layer disposed on the outside of each wheel 28 to provide additional traction with the blade 16. In alternative embodiments, tracks or a walking mechanism (e.g., reciprocating legs) may be employed to engage the surface of the blade 16.

The automated vehicle 24 also includes a self-contained drive unit or motor 30 coupled to two wheels 28 by a shaft 32. The motor 30 is configured to drive the wheels 28 such that the vehicle 24 translates along the upwardly facing edge of the wind turbine blade 16. In the present embodiment, the motor 30 is an electric motor. However, alternative embodiments may employ other motor configurations such as pneumatic, hydraulic, or a combustion engine. Furthermore, in alternative embodiments, the motor 30 may be coupled to additional wheels 28 (e.g., 2, 4 or 6 wheel drive). In addition, further embodiments may employ multiple motors 30 coupled to multiple sets of wheels 28. Regardless of the motor configuration, the self-contained drive unit 30 is configured to move the automated vehicle 24 along the blade 16 without any external assistance. Specifically, the wheels 28, as driven by the motor 30, are capable of translating the automated vehicle 24 without any other coupling between the vehicle 24 and the blade 16 (i.e., pulleys, cables, etc.). In other words, the drive unit 30 is self-contained within the automated vehicle 24 and operates independently of an external means of propulsion.

As previously discussed, the automated vehicle 24 includes a self-contained support or balance, such as wings 34 extending from each lateral side of the body 26. The self-contained support is configured to enable the automated vehicle 24 to traverse the wind turbine blade 16 without any external connection to the tower 12, nacelle 14, or other support structure (e.g., crane). Specifically, the self-contained support enables the automated vehicle 24 to self-balance on the blade 16, thereby obviating any external means of support, such as cables, pulleys, or other connection to an external structure.

In the present configuration, a single wing structure extends through the body 26 to each lateral side. Alternative embodiments may include at least one wing 34 extending from each lateral side of the body 26. As discussed in detail below, the wing 34 may be curved or angled downwardly such that the center of gravity of the automated vehicle 24 is lower than the upwardly facing edge of the wind turbine blade 16. This configuration may enhance the stability of the automated vehicle 24 in high wind situations. Furthermore, in the present embodiment, a lateral position of the wing 34 is adjustable. Specifically, a wing positioning mechanism 36 is coupled to the wing 34 and configured to laterally translate the wing 34 to compensate for lateral movement of the automated vehicle 24. The wing positioning mechanism 36 may include any suitable linear actuator. For example, the wing positioning mechanism 36 may include a pinion gear configured to interlock with a rack on the wing 34. As the pinion gear rotates, the rack translates in the lateral direction, thereby adjusting the wing position. For example, if the wind is blowing the automated vehicle 24 in one lateral direction, the wing positioning mechanism 36 may automatically translate the wing 34 in the opposite lateral direction to compensate. In an alternative configuration, wings 34 extending from each lateral side of the automated vehicle 24 may be coupled to the body 26 by a pivot. If the automated vehicle 24 laterally rotates or translates with respect to the blade 16, the wing positioning mechanism 36 may rotate each wing 34 either upwardly or downwardly to compensate. The adjustable wing configuration may provide enhanced stability of the automated vehicle 24, especially in high wind conditions.

In certain embodiments, the wings 34 include one or more batteries configured to supply electrical power to the wing positioning mechanism 36, the motor 30, and other electronic components within the automated vehicle 24. For example, the wing 34 may include a hollow structure housing multiple battery cells. Alternatively, the wing 34 may include one or more cells particularly contoured to correspond to the shape of the wing 34. The battery cells may include any suitable configuration of rechargeable or non-rechargeable battery, such as alkaline, lithium polymer, nickel metal hydride, or sealed lead-acid, for example. The weight of the batteries within the downwardly sloped wing 34 may serve to decrease the center of gravity, thereby enhancing the stability of the automated vehicle 24. Furthermore, the batteries enable the automated vehicle 24 to be a self-contained and self-powered system (i.e., operate without any connection to an external structure). Alternatively, the automated vehicle 24 may be powered by an outside source, such as an electrical power cable or tether extending from the automated vehicle 24 to the nacelle 14 of the wind turbine system 10. In such a configuration, the wing 34 may include a heavy material (e.g., steel, lead, etc.) configured to lower the center of gravity of the automated vehicle 24. While the power cable electrically couples the automated vehicle 24 to a remote power source, no external means of support or propulsion is present (e.g., pulleys, cables, etc.). Therefore, the self-contained support and the self-contained drive unit continue to obviate an external connection to a support structure (e.g., tower 12, nacelle 14, crane, etc.).

The wing positioning mechanism 36 is communicatively coupled to a controller 38. In certain configurations, the controller 38 is configured to detect lateral movement of the automated vehicle 24 and instruct the wing positioning mechanism 36 to compensate. In alternative embodiments, the wing positioning mechanism 36 may include a self-contained unit configured to adjust the wing position based on lateral movement of the automated vehicle 24. The controller 38 may also be communicatively coupled to the motor 30 to instruct the motor 30 to alter its rotational speed based on various input conditions (e.g., wind speed, blade inspection instrument configuration, etc.).

The automated vehicle 24 also includes a cleaning system including a cleaning fluid storage tank 40, a cleaning fluid delivery system or spray nozzle 42, a rotating cleaning brush 44 and a cleaning brush drive motor 46. In the present embodiment, the cleaning fluid storage tank 40 is configured to store and supply cleaning fluid (e.g., via a pump) to the spray nozzle 42. The spray nozzle 42, in turn, is configured to deliver the cleaning fluid to the surface of the upwardly facing edge of the wind turbine blade 16. In certain configurations, the cleaning brush 44 is cylindrical and configured to rotate when driven by the motor 46. As illustrated, the motor 46 is communicatively coupled to the controller 38 such that the controller 38 may adjust rotational speed of the brush 44 based on blade configuration, quantity of debris, or other factors. The combination of the rotating brush 44 and the cleaning fluid may serve to remove debris from the upwardly facing edge of the blade 16. While a single cleaning brush 44 is employed in the present embodiment, alternative embodiments may include additional cleaning brushes 44. For example, in certain configurations, two or more cylindrical rotating cleaning brushes 44 may be positioned adjacent to the upwardly facing edge of the wind turbine blade 16. The cleaning brushes 44 may be arranged to conform to the contours of the upwardly facing edge, thereby providing enhanced cleaning. In further embodiments, the automated vehicle 24 may also include a blade waxing system. Such embodiments may include a wax applicator and a rotating buffer configured to apply a wax coating to the blade 16. The wax may serve to increase the smoothness of the upwardly facing edge, thereby increasing blade efficiency.

The present configuration also includes an inspection instrument 48 configured to obtain data indicative of a defect associated with the wind turbine blade 16. In certain configurations, the inspection instrument 48 may include a digital camera configured to capture images of the blade 16 for real-time or later analysis. The camera may capture various surface defects such as pits, scratches and/or cracks. An operator may review the captured images to determine whether repairs should be performed or the blade 16 should be replaced. The inspection instrument 48 may also include an ultrasonic transducer configured to transmit acoustical energy into the blade 16. Acoustical energy reflected from the blade 16 is then detected by the ultrasonic transducer which forms an image of the blade structure. This system may be well suited to identify cracks or internal defects within the wind turbine blade 16. In certain embodiments employing an ultrasonic transducer, the automated vehicle 24 may apply an acoustically conductive medium (e.g., water, ultrasound gel, etc.) between the ultrasonic transducer and the blade 16 to facilitate transmission of acoustical energy. The automated vehicle 24 may also employ a pulsed thermography system, including an infrared source and detector. The infrared source transmits a pulse of thermal energy toward the blade 16. After a delay, the detector captures a thermal image of the blade section exposed to the thermal energy. Defects within the blade 16 may be detected based on the manner in which the thermal energy is transmitted through the blade 16. In certain embodiments, the detector may be configured to capture images for later analysis such that blade defects may be identified. Alternative embodiments may employ other inspection instruments 48 capable of detecting flaws and/or structural defects within the wind turbine blade 16. Further embodiments may employ a combination of inspection instruments 48 to detect a variety of different defects.

In the present embodiment, the inspection instrument 48 is communicatively coupled to the controller 38. The controller 38 may both operate the inspection instrument 48 and/or receive data from the inspection instrument 48. For example, in embodiments employing a digital camera, the controller 38 may instruct the camera when to capture images. For example, based on a known speed and camera field of view, the controller 38 may adjust image capture frequency such that the entire surface of the blade 16 is imaged. Similarly, the controller 38 may adjust pulse frequency of the ultrasonic transducer and/or the pulsed thermography system. In this manner, a complete analysis of the blade 16 may be performed. In addition, the controller 38 may capture images from the camera, ultrasonic transducer, pulsed thermography system, and/or other inspection instrument 48, and store the images in a memory 50. In the present embodiment, the memory 50 is communicatively coupled to the controller 38, and configured to receive and store images and/or data from the inspection instrument 48. The memory 50 may include any suitable storage medium, such as a magnetic hard drive, a solid state disk, or other storage device.

The controller 38 may also be communicatively coupled to a communications module 52. The communications module 52 may be configured to both send and receive data between the automated vehicle 24 and a remote base unit 53. For example, an operator may send signals to the automated vehicle 24 via the communications module 52, instructing the vehicle 24 to move along the upwardly facing edge of the wind turbine blade 16. Similarly, the communications module 52 may transmit data and/or images from the inspection instrument 48 to the remote base unit 53 in real-time. In certain configurations, the inspection instrument 48 includes a video camera capable of capturing multiple images per second. These images may first be conveyed to the controller 38, and then to the remote base unit 53 via the communications module 52. The remote base unit 53 may include a display configured to present the captured images to the operator. The operator may then note any potential defects within the wind turbine blade 16. In addition, the operator may control operation of the automated vehicle 24 based on the displayed images or other data received by the remote base unit 53. For example, if the operator determines that an area of the blade 16 has not been adequately cleaned, the operator may instruct the automated vehicle 24 to return to the area and perform further cleaning operations. The communications module 52 may communicate with the remote base unit 53 via a wired connection (e.g., electrical or fiber optic), or a wireless communications link (e.g., radio frequency transmissions). Furthermore, the communications protocol may be standard (e.g., WiFi, Bluetooth, etc.) or proprietary.

Figure 3:
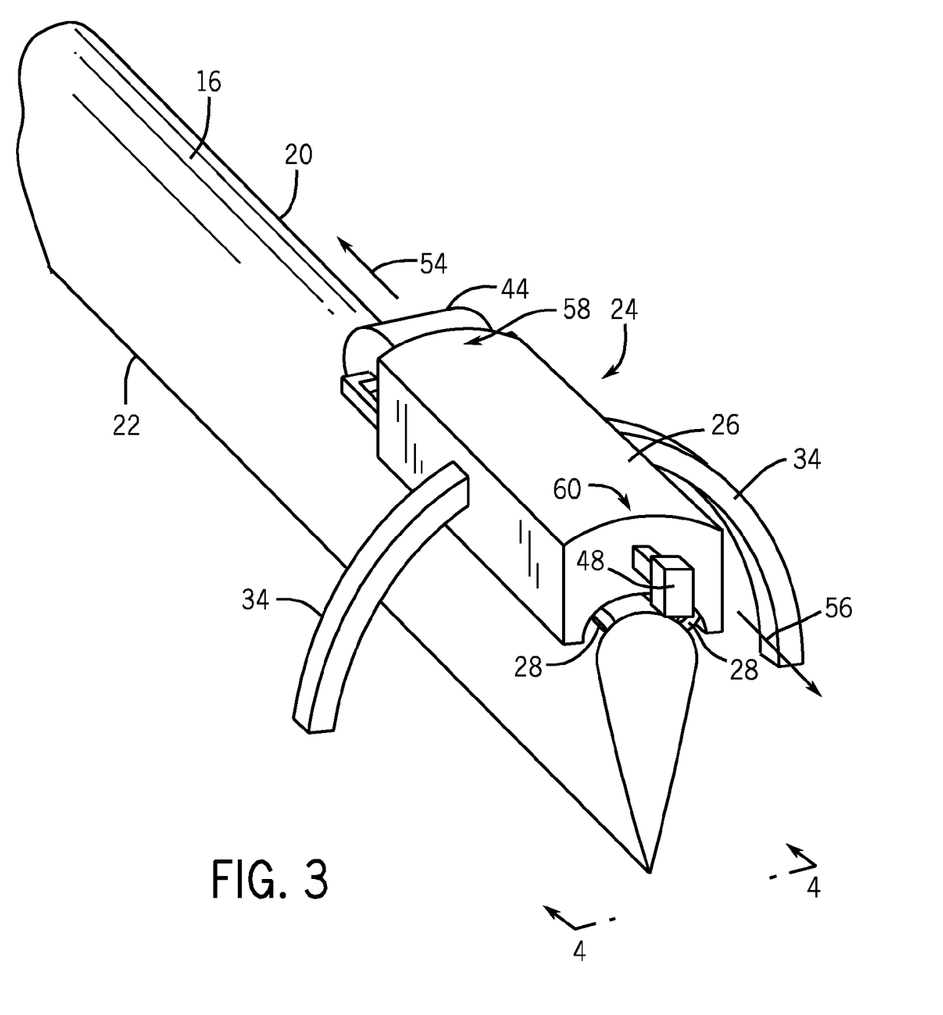
FIG. 3 is a perspective view of the automated wind turbine blade cleaning and inspection system, as shown in FIG. 1, in accordance with certain embodiments of the present technique.

FIG. 3 is a perspective view of an embodiment of the automated vehicle 24. As previously discussed, the automated vehicle 24 may be placed on the upwardly facing edge (e.g., leading edge 20) of the wind turbine blade 16 by an operator within the nacelle 14. The automated vehicle 24 may then traverse the blade 16 in a direction 54 away from the hub 18. When the automated vehicle 24 reaches the blade tip, it may reverse direction and return to the hub 18 in a direction 56. In certain embodiments, the automated vehicle 24 may include sensors configured to detect the blade tip, and automatically reverse direction. In alternative embodiments, an operator controlling the automated vehicle 24 via the remote base unit 53 may manually reverse the automated vehicle 24 upon reaching the tip of the blade 16. In certain embodiments, the automated vehicle 24 may operate the cleaning brush 44 while moving in both direction 54 and direction 56. In alternative embodiments, the cleaning brush 44 may only operate while the automated vehicle 24 is traveling in one direction 54 or 56.

As illustrated, the cleaning brush 44 is positioned at a first end 58 of the automated vehicle 24, while the inspection instrument 48 is positioned at a second end 60 of the automated vehicle 24. In alternative embodiments, the cleaning brush 44 and the inspection instrument 48 may be positioned at the same end, 58 or 60. In further embodiments, a waxing system may be positioned at an opposite end of the automated vehicle 24 from the cleaning brush 44. For example, the cleaning brush 44 may be positioned at the first end 58, while the waxing system is positioned at the second end 60. In such a configuration, the cleaning brush 44 may operate while the automated vehicle 24 is traveling in the direction 54, and the waxing system may operate while the automated vehicle 24 is traveling in the direction 56. In this manner, debris may be removed from the blade 16, and the blade 16 may be waxed to provide enhanced air flow.

Figure 4:
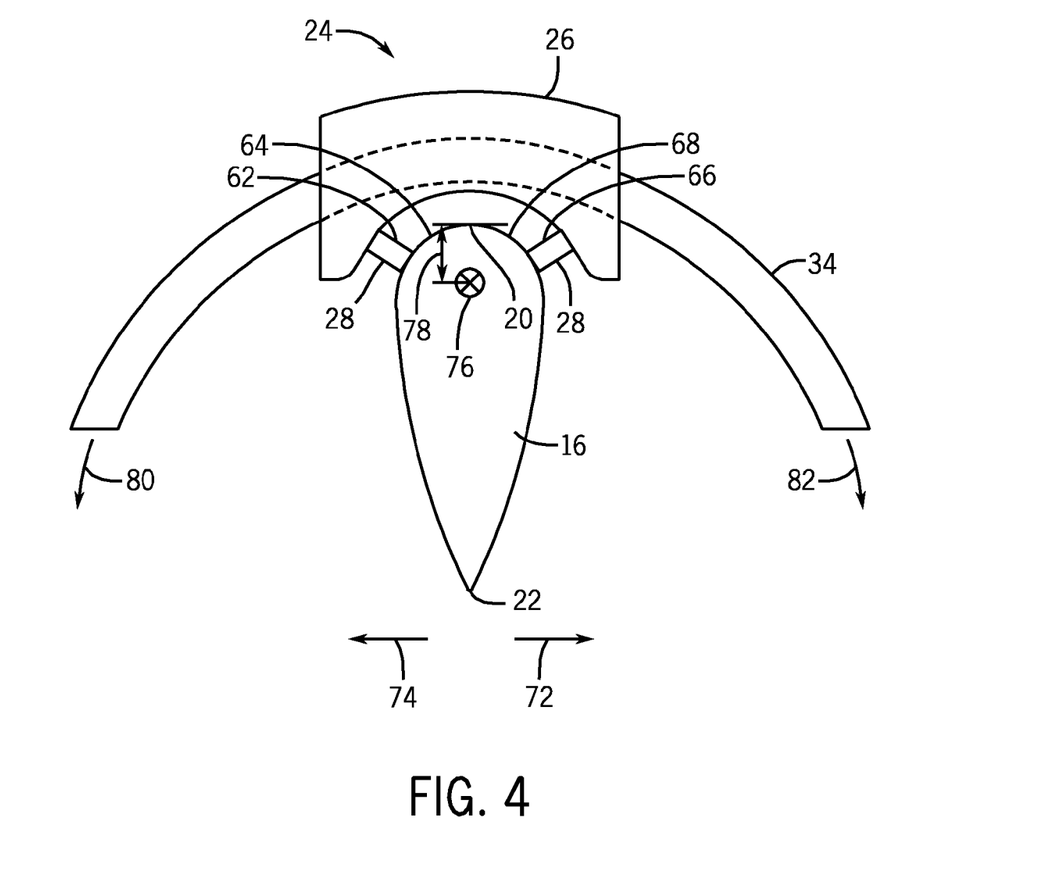
FIG. 4 is a back view of the automated wind turbine blade cleaning and inspection system, taken along line 4-4 of FIG. 3, in accordance with certain embodiments of the present technique.

FIG. 4 is a back view of an embodiment of the automated vehicle 24, taken along line 4-4 of FIG. 3. As previously discussed, the automated vehicle 24 is configured to balance on an upwardly facing edge of the horizontally positioned wind turbine blade 16. In the present configuration, the automated vehicle 24 includes wheels 28 positioned on opposite lateral sides of the leading edge 20. The position and orientation of the wheels 28 are configured to enhance stability of the automated vehicle 24 as it traverses the blade 16. Specifically, a first wheel 62 is configured to engage a first lateral side 64 of the blade 16, while a second wheel 66 is configured to engage a second lateral side 68 of the blade 16. In this configuration, a lateral force applied to the automated vehicle 24 in a direction 72 by the wind may be resisted by contact between the first wheel 62 and the first lateral side 64 of the blade 16. Similarly, a lateral force applied to the automated vehicle 24 in a direction 74 by the wind may be resisted by contact between the second wheel 66 and the second lateral side 68 of the blade 16. In this manner, the automated vehicle 24 may remain balanced on the upwardly facing edge despite high wind conditions (i.e., wind blowing in the direction 72 or 74).

The automated vehicle 24 also includes wings 34 extending from each lateral side of the body 26 to further enhance stability. In the present embodiment, the wings 34 are formed from a single structure curved downwardly such that a center of gravity 76 of the automated vehicle 24 is positioned a distance 78 below the leading edge 20. As previously discussed, the wing 34 may be appropriately weighted (e.g., with batteries) to further increase the distance 78, thereby enhancing stability. This configuration may serve to facilitate movement of the automated vehicle 24 along the blade 16 in high wind conditions.

In further embodiments, a lateral position of the wing 34 may be adjusted to compensate for wind or other forces that may cause lateral movement of the automated vehicle 24 (e.g., blade vibrations). For example, if the wind is blowing in the direction 72, the wing 34 may automatically move in the direction 80 to compensate. Specifically, the wind blowing in the direction 72 may cause the automated vehicle 24 to rotate and/or translate in the direction 72. By moving the wing 34 in the direction 80, the center of gravity 76 of the automated vehicle 24 may be shifted in the direction 74, thereby compensating for the laterally induced movement. Similarly, if the wind is blowing in the direction 74, the wing 34 may move in the direction 82 to compensate. In this manner, stability of the automated vehicle 24 may be maintained despite high wind conditions. For example, the combination of positioning wheels on opposite lateral sides of the blade 16 and the downwardly sloped and/or movable wing 34 may serve to facilitate operation of the automated vehicle 24 in wind conditions corresponding to the maximum allowable wind for an operator to climb the tower 12 and enter the nacelle 14 (e.g., approximately 15 m/s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an automated vehicle configured to traverse an upwardly facing edge of a wind turbine blade when the wind turbine blade is oriented in a substantially horizontal position, comprising:
a plurality of wheels configured to engage the wind turbine blade;
a drive unit configured to rotate at least one of the plurality of wheels;
a balance configured to stabilize the automated vehicle on the upwardly facing edge of the wind turbine blade by distributing weight about a center of gravity; and
a cleaning system configured to clean the upwardly facing edge of the wind turbine blade;
wherein the automated vehicle is configured to be supported by only an upper portion of the wind turbine blade extending lengthwise along the wind turbine blade, and the upper portion includes the upwardly facing edge.

2. The system of claim 1, wherein the automated vehicle comprises an inspection instrument configured to obtain data indicative of a defect associated with the wind turbine blade.

3. The system of claim 2, wherein the inspection instrument comprises a camera configured to visually inspect a surface of the wind turbine blade.

4. The system of claim 2, wherein the inspection instrument comprises an ultrasonic transducer.

5. The system of claim 1, wherein the balance comprises wings extending from each lateral side and angled downwardly.

6. The system of claim 5, wherein the wings are configured to automatically reposition to balance the automated vehicle on the upwardly facing edge of the wind turbine blade.

7. The system of claim 5, wherein the wings comprise batteries configured to power the drive unit, the cleaning system, an inspection instrument, or a combination thereof.

8. The system of claim 1, wherein the cleaning system comprises a rotating brush configured to remove debris from the upwardly facing edge of the wind turbine blade upon contact.

9. The system of claim 8, wherein the cleaning system comprises a cleaning fluid delivery system configured to spray cleaning fluid onto the upwardly facing edge of the wind turbine blade.

10. A system comprising:
a blade maintenance vehicle, comprising:
a blade maintenance system configured to perform one or more maintenance functions associated with a wind turbine blade;
a self-contained drive configured to move the blade maintenance vehicle along the wind turbine blade; and
a self-contained support configured to balance the blade maintenance vehicle on the wind turbine blade by distributing weight about a center of gravity;
wherein the blade maintenance vehicle is configured to be supported by only an upper portion of the wind turbine blade extending lengthwise along the wind turbine blade, and the upper portion includes the upwardly facing edge.

11. The system of claim 10, wherein the blade maintenance system comprises an inspection instrument, a cleaning system, or a combination thereof.

12. The system of claim 10, wherein the self-contained support is automatically adjustable to balance the blade maintenance vehicle on the wind turbine blade.

13. The system of claim 10, wherein the self-contained support comprises a plurality of wings configured to stabilize the blade maintenance vehicle on the wind turbine blade.

14. The system of claim 13, wherein the plurality of wings is adjustable to automatically balance the blade maintenance vehicle on the upwardly facing edge of the wind turbine blade while the wind turbine blade is positioned in a generally horizontal orientation.

15. The system of claim 10, wherein the blade maintenance vehicle is communicatively coupled to a remote base unit configured to control the blade maintenance vehicle.

16. A system comprising:
a blade maintenance vehicle, comprising:
a self-contained balance configured to stabilize the blade maintenance vehicle on an upwardly facing edge of a horizontally positioned wind turbine blade by distributing weight about a center of gravity;
wherein the blade maintenance vehicle is configured to be supported by only an upper portion of the wind turbine blade extending lengthwise along the wind turbine blade, and the upper portion includes the upwardly facing edge.

17. The system of claim 16, wherein the self-contained balance comprises one or more lateral wings configured to automatically reposition to balance the blade maintenance vehicle.

18. The system of claim 16, wherein the self-contained balance comprises one or more lateral wings oriented downwardly to lower the center of gravity of the blade maintenance vehicle.

19. The system of claim 16, wherein the blade maintenance vehicle comprises a self-contained drive configured to move the blade maintenance vehicle on the upwardly facing edge of the horizontally positioned wind turbine blade.

20. The system of claim 16, wherein the blade maintenance vehicle comprises an inspection instrument, a cleaning system, or a combination thereof.

21. A system comprising:
   an automated vehicle configured to traverse an upwardly facing edge of a wind turbine blade when the wind turbine blade is oriented in a substantially horizontal position, comprising:
      a plurality of wheels configured to engage the wind turbine blade;
      a drive unit configured to rotate at least one of the plurality of wheels;
      a balance configured to stabilize the automated vehicle on the upwardly facing edge of the wind turbine blade by distributing weight about a center of gravity, wherein the balance comprises wings extending from each lateral side and angled downwardly; and
   a cleaning system configured to clean the upwardly facing edge of the wind turbine blade.

22. A system comprising:
a blade maintenance vehicle, comprising:
   a blade maintenance system configured to perform one or more maintenance functions associated with a wind turbine blade;
   a self-contained drive configured to move the blade maintenance vehicle along the wind turbine blade; and
   a self-contained support configured to balance the blade maintenance vehicle on the wind turbine blade by distributing weight about a center of gravity, wherein the self-contained support comprises a plurality of wings configured to stabilize the blade maintenance vehicle on the wind turbine blade.

* * * * *